(12) United States Patent
Lindau

(10) Patent No.: US 7,524,471 B2
(45) Date of Patent: Apr. 28, 2009

(54) MERCURY EMISSION CONTROL FOR COAL-FIRED BOILERS

(75) Inventor: Leif A. V. Lindau, Arlov (SE)

(73) Assignee: Alstom Technology Ltd, Baden (CH)

( * ) Notice: Subject to any disclaimer, the term of this patent is extended or adjusted under 35 U.S.C. 154(b) by 413 days.

(21) Appl. No.: 11/521,336

(22) Filed: Sep. 13, 2006

(65) Prior Publication Data
US 2008/0060520 A1 Mar. 13, 2008

(51) Int. Cl.
B01D 47/00 (2006.01)

(52) U.S. Cl. .............. 423/210; 95/134; 95/235

(58) Field of Classification Search ............. None
See application file for complete search history.

(56) References Cited

U.S. PATENT DOCUMENTS

| | | | |
|---|---|---|---|
| 5,595,713 A * | 1/1997 | Gohara et al. | 422/170 |
| 5,670,122 A * | 9/1997 | Zamansky et al. | 423/210 |
| 5,674,459 A | 10/1997 | Gohara et al. | |
| 6,528,030 B2 * | 3/2003 | Madden et al. | 423/210 |
| 6,962,617 B2 | 11/2005 | Simpson | |
| 2005/0214187 A1 * | 9/2005 | Johnson | 423/235 |
| 2005/0255019 A1 | 11/2005 | Parrish | |
| 2005/0255022 A1 * | 11/2005 | Parrish et al. | 423/243.01 |

OTHER PUBLICATIONS

"Removal and Measurement of Mercury in the Thermal Treatment of Wastes", by. H.-R. Paur, et al., for presentation at the ACHEMA 2000 Congress "Sustainable Thermal Waste Treatment", May 22-23, 2000, Frankfurt, Germany.
"Flue Gas Desulfurization Plant", Mitsubishi Heavy Industries New, printed from website http://www.mih.co.jp/mcec/product/fgd.htm on Sep. 15, 2005.
"Wet Flue Gas Desulfurization", printed from World Bank website, http://www.worldbbank.org/html/fpd/em/power/EA/mitigatn/aqsowet.stm, on May 30, 2007.
"Full-Scale Testing of Mercury Control for Wet FGD Systems", by G.T. Amrhein, et al., presented at the 27th International Technical Conference on Coal Utilization and Fuel Systems, Mar. 4-7, 2002 in Clearwater, Florida.

* cited by examiner

Primary Examiner—Melvin C Mayes
Assistant Examiner—Smita Patel
(74) Attorney, Agent, or Firm—Wiggin and Dana LLP; Anthony P. Gangemi

(57) ABSTRACT

One embodiment of the present invention relates to a process for treating a flue gas stream (22) from a coal-fired boiler to reduce the amount of mercury contained therein. The process includes subjecting the flue gas stream (22) to a first wet scrubbing process for reducing the concentration of sulfur oxides therein and thereby producing a water-saturated flue gas stream (22) and subjecting the water-saturated flue gas stream to a second wet scrubbing process having an aqueous acidic solution comprising hydrogen peroxide to produce a flue gas having a reduced mercury content.

5 Claims, 4 Drawing Sheets

MERCURY EMISSION CONTROL FOR COAL-FIRED BOILERS

BACKGROUND OF THE INVENTION

1. Field of the Invention

The present invention relates to a process and system for removing contaminants from a flue gas. More particularly, the present invention relates to a process and system for removing mercury from a flue gas.

2. Description of the Related Art

The combustion of coal in a coal-fired boiler, such as incident to the production of steam for turbines at a power generating station or process steam at industrial plants, produces a waste gas, referred to as flue gas, containing numerous particulate and gaseous contaminants. Among these contaminants are fly ash, nitrogen oxides, sulfur oxides and the like, whose concentration in the flue gas must be reduced, in compliance with federal, state or municipal laws and ordinances, before the gas may be emitted to the atmosphere. Included among the contaminants is mercury, which is released from the coal as gaseous elemental mercury in the elevated temperature environment of the combustion process and which, as a result of cooling of the flue gas and various contaminant-reduction treatments to which the flue gas is subsequently subjected, may end up as a mix of elemental and oxidized mercury species in the flue gas.

In a typical flue gas treatment process, the flue gas from the coal-fired boiler is first subjected to fly ash removal, such as with an electrostatic precipitator or a baghouse, followed by processes for removing sulfur oxides from the flue gas (flue gas desulfurization, or FGD). A common FGD system is a so-called wet flue gas desulfurization (WFGD) method, also referred to simply as wet scrubbing, in which the flue gas enters a large vessel (spray tower or absorber) and is sprayed with a water slurry containing lime or limestone. The calcium in the slurry reacts with the sulfur oxides, most prominently $SO_2$, to remove these oxides from the flue gas in the form of calcium sulfite or calcium sulfate. Such process produces a substantially desulfurized water-saturated flue gas for eventual emission into the atmosphere. Optionally, prior to emission into the atmosphere, the flue gas is further treated in various ways. For example, a moisture removal step, nitrogen oxide reduction treatment, or the like.

In this typical process, a small portion of the mercury in the combustion flue gas is removed in association with the fly ash during the fly ash collection step, while additional portions of mercury are removed via dissolution in the course of the wet scrubbing process. Nevertheless, the mercury removal efficiency achieved in a typical fly ash pre-removal/WFGD process for a flue gas from a coal-fired boiler is not sufficient for achieving compliance with applicable mercury removal requirements. Improvements have been attempted in which mercury complexing agents are added to the scrubbing slurry so as to promote more effective mercury removal during the WFGD process, but even here the best results obtained are not satisfactory for compliance with applicable air quality regulations.

BRIEF SUMMARY OF THE INVENTION

One aspect of the invention relates to a process for treating a flue gas stream produced by combustion of coal, to reduce a content of mercury in the flue gas stream. The process includes: subjecting the flue gas stream to a particulate collector; thereafter subjecting the flue gas stream to a first wet scrubbing process for reducing a concentration of sulfur oxides therein through contact of the flue gas stream with an aqueous calcium-based slurry to form sulfate and sulfite salts and produce a flue gas stream having a reduced sulfur oxide content; thereafter passing the flue gas stream through a mist eliminator to remove moisture from the flue gas stream; and thereafter subjecting the flue gas stream to a second wet scrubbing process having an aqueous acidic scrubbing solution comprising hydrogen peroxide to produce a flue gas having a reduced mercury content.

Another aspect of the invention relates to a system for reducing a mercury content of a flue gas stream from a coal-fired boiler. The system includes: a particulate collector for receiving a flue gas stream from a coal-fired boiler; a first wet scrubber apparatus for receiving the flue gas stream from the particulate collector; a mist eliminator operatively connected to the first scrubber apparatus; and a second wet scrubber apparatus for receiving the flue gas stream from the mist eliminator, wherein the second wet scrubber apparatus comprises means for contacting the flue gas stream with an aqueous acidic scrubbing solution comprising hydrogen peroxide to reduce the mercury content of the flue gas stream.

Yet another aspect of the present invention relates to a system for removing contaminants, including mercury, from a flue gas stream. The system includes: a first scrubber for scrubbing the flue gas stream with an aqueous calcium-based slurry to produced a water-saturated flue gas stream of reduced sulfur oxide content; a moisture removing means for removing water droplets and moisture from the water-saturated flue gas stream; and a second scrubber for scrubbing the flue gas stream located downstream of the moisture removing means, wherein the second wet scrubber introduces an aqueous acidic scrubbing solution comprising hydrogen peroxide, thereby removing mercury from the flue gas stream.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

For the purpose of illustrating the invention, the drawings show a form of the invention that is presently preferred. However it should be understood that the present invention is not limited to the precise arrangements and instrumentalities shown in the drawings, wherein.

DETAILED DESCRIPTION

While not wanting to be bound to any theory, it is believed the inefficiency of current WFGD systems known in the art, including those using complexing agents in the calcium-based scrubbing slurry, in reducing the mercury content of the flue gas arises, at least in part, because the massive sulfur oxidation occurring in the WFGD system incident to sulfur oxide removal correspondingly causes the reduction of mercuric species to elemental mercury, which remain as a gaseous species in the flue gas stream rather than precipitating out in ionic form along with the sulfate and sulfite salts. In one embodiment of the current invention, reducing the mercury content of the flue gas stream occurs when the flue gas stream is scrubbed in a second wet scrubber apparatus with an aqueous acidic scrubbing solution at a time when most of the sulfur oxides have been removed from the flue gas stream.

Figure 1:
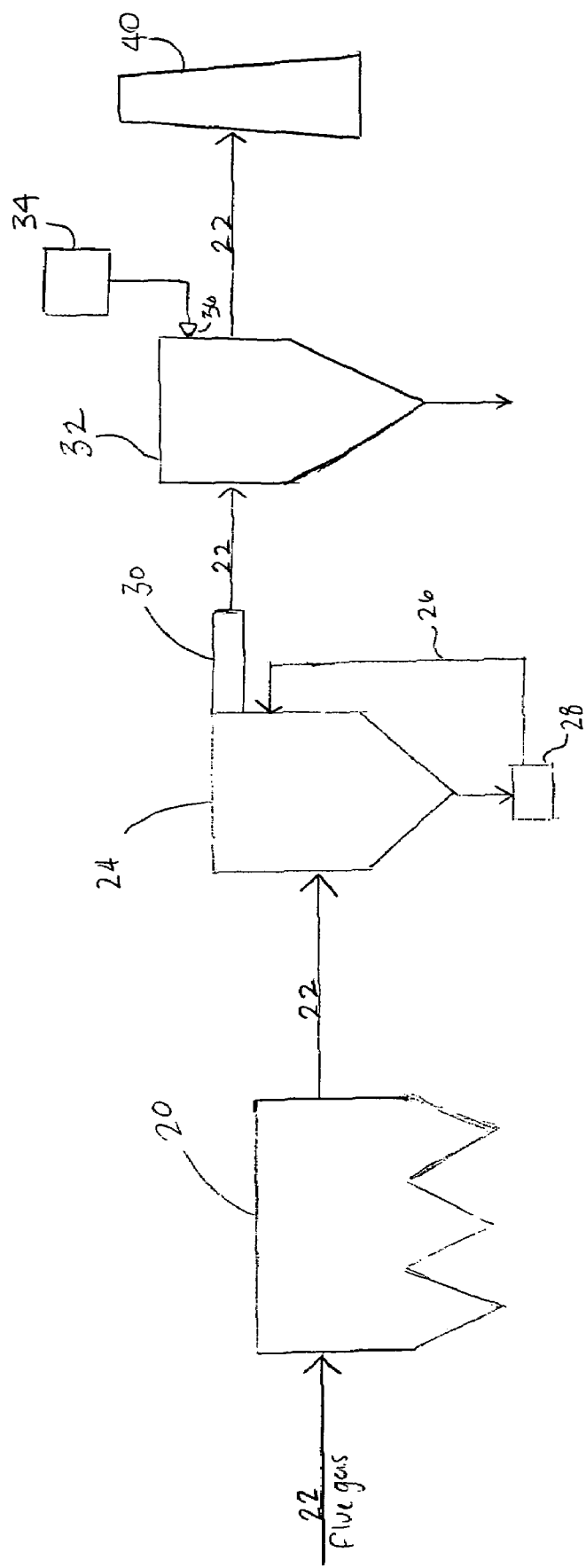
FIG. 1 illustrates one embodiment of a system for processing and treating flue gas.

In one embodiment of the present invention as depicted in FIG. 1, the system for reducing contaminants, such as sulfur oxides and mercury, in a flue gas stream includes a treatment train first having a particulate collector 20. Particulate collector 20 may be any apparatus known in the art that facilitates the removal of particulates such as fly ash from a flue gas stream 22 of a coal-fired boiler. Examples of particulate collectors include, but are not limited to, electrostatic precipitators (ESPs), baghouses, screens, sieves, and the like.

Flue gas stream 22 exits particulate collector 20 and is directed to a first wet scrubber apparatus 24 through suitable flue work. First wet scrubber apparatus 24 may be any suitable apparatus or arrangement that enables intimate contact between the flue gas and an aqueous calcium-based slurry 26 for removing acid gases, such as sulfur oxides, from flue gas stream 22. Examples of first wet scrubbing apparatus 24 include a spray tower or absorber used in WFGD systems.

Calcium-based slurry 26 is stored in tank 28 prior to introduction to first wet scrubber apparatus 24.

Figure 2:
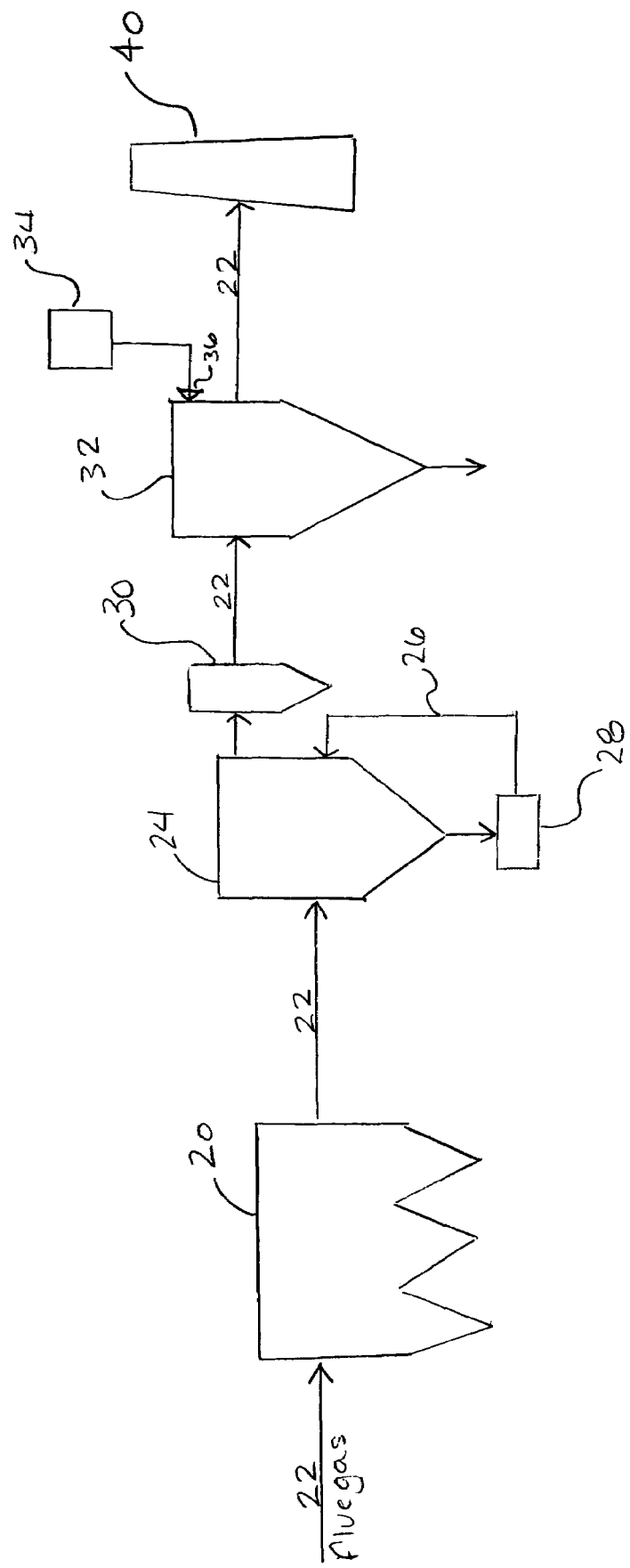
FIG. 2 illustrates one embodiment of a system for processing and treating flue gas.

Flue gas stream 22 exits first wet scrubber apparatus 24 and may be directed to a moisture removal device 30 for removing slurry droplets and moisture from the flue gas stream. Moisture removal device 30 may be a mist eliminator. As shown in FIG. 1, the flue gas stream 22 may be directed to moisture removal device 30 which is directly integrated with first wet scrubbr apparatus 24. Alternatively, and as shown in FIG. 2, moisture removal device 30 can be a stand alone unit to which the scrubbed flue gas stream is directed through flue work.

Downstream of first wet scrubber apparatus 24 and moisture removal device 30 is a second wet scrubber apparatus 32 to which flue gas stream 22 is passed. Second wet scrubber apparatus 32 is similar to first wet scrubber apparatus 24 in that it may be a spray tower or absorber used in WFGD systems.

Second wet scrubber apparatus 32 is fed from a tank 34, which holds an aqueous acidic scrubbing solution. The aqueous acidic scrubbing solution contains hydrogen peroxide. The hydrogen peroxide may be present in the aqueous acidic scrubbing solution in a concentration between about 0.1% to about 15% by weight, based on the weight of the aqueous acidic scrubbing solution. Tank 34 is supplied with a hydrogen peroxide solution having a concentration of between about 15% and about 50% and with dilution water so as to provide an aqueous acidic scrubbing solution of appropriate concentration. The aqueous scrubbing solution can be replenished in tank 34 either continuously or batch-wise.

Figure 3:
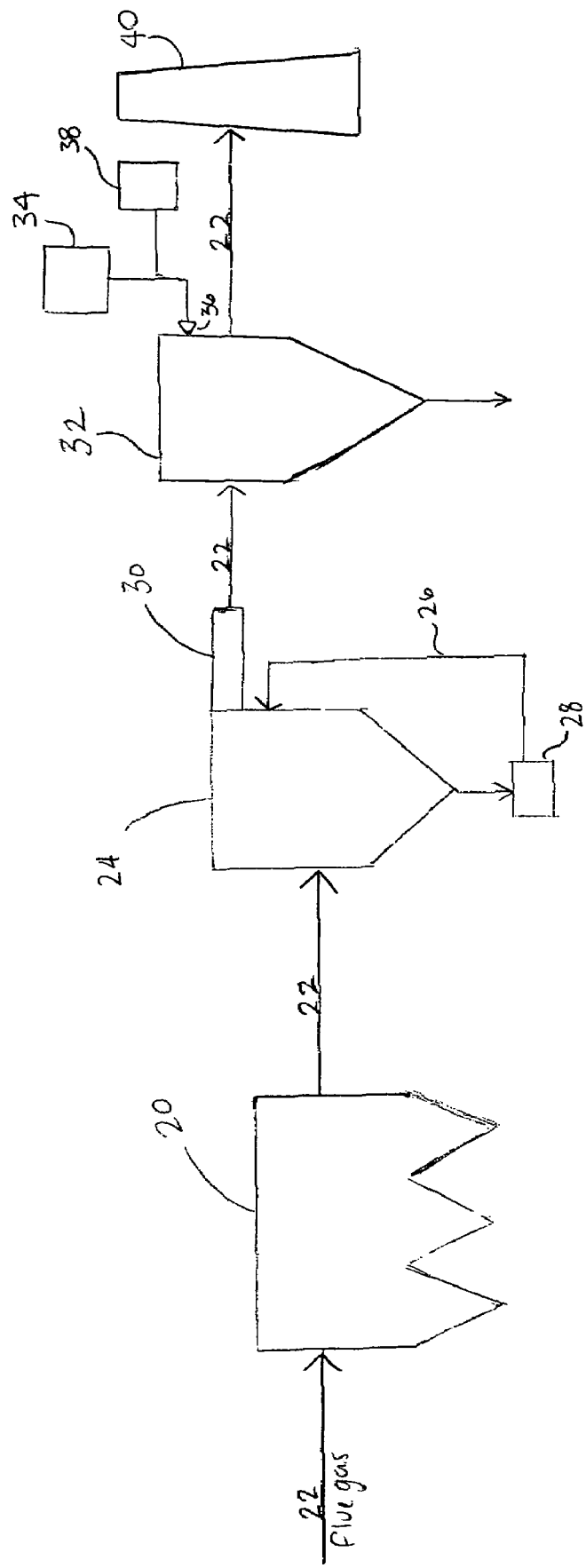
FIG. 3 illustrates one embodiment of system of a system for processing and treating flue gas.

Duct work from tank 34 may terminate at second wet scrubber apparatus 32 in at least one device 36 to control the flow of the aqueous acidic scrubbing solution to the second wet scrubber apparatus. Device 36 can be a nozzle, a valve or the like. Additionally, as shown in FIG. 3, the duct work may be connected to a monitoring device 38 to monitor an amount of aqueous acidic scrubbing solution that is fed into second wet scrubber apparatus 32. Monitoring device 38 may be a meter, a gauge, a computer, or any other device that can monitor the amount of aqueous acidic scrubbing solution transported to second wet scrubber apparatus 32. Monitoring device 38 optionally has a user interface that allows a user to increase, decrease, stop or start the flow of the scrubbing solution to second wet scrubber apparatus 32. Other monitoring devices may be placed throughout the system at other connections where a user deems monitoring necessary.

After the aqueous acidic scrubbing solution is introduced to second wet scrubber apparatus 32, it contacts the flue gas stream 22 present in the second wet scrubber. The hydrogen peroxide present in the aqueous acidic scrubbing solution reacts with mercury present in flue gas stream 22 and removes it therefrom. Typically, elemental mercury is present in flue gas stream 22, which is in second wet scrubber apparatus 32. The hydrogen peroxide oxidizes the elemental mercury which is then transformed into a soluble mercury compound, such as mercury oxide. The soluble mercury is then easily removed from flue gas stream 22.

Flue gas stream 22 emanates from second wet scrubber apparatus 32 and is passed to a stack 40 by pipes or ducts which allow the flue gas stream to pass and ultimately be released out into the atmosphere.

Figure 4:
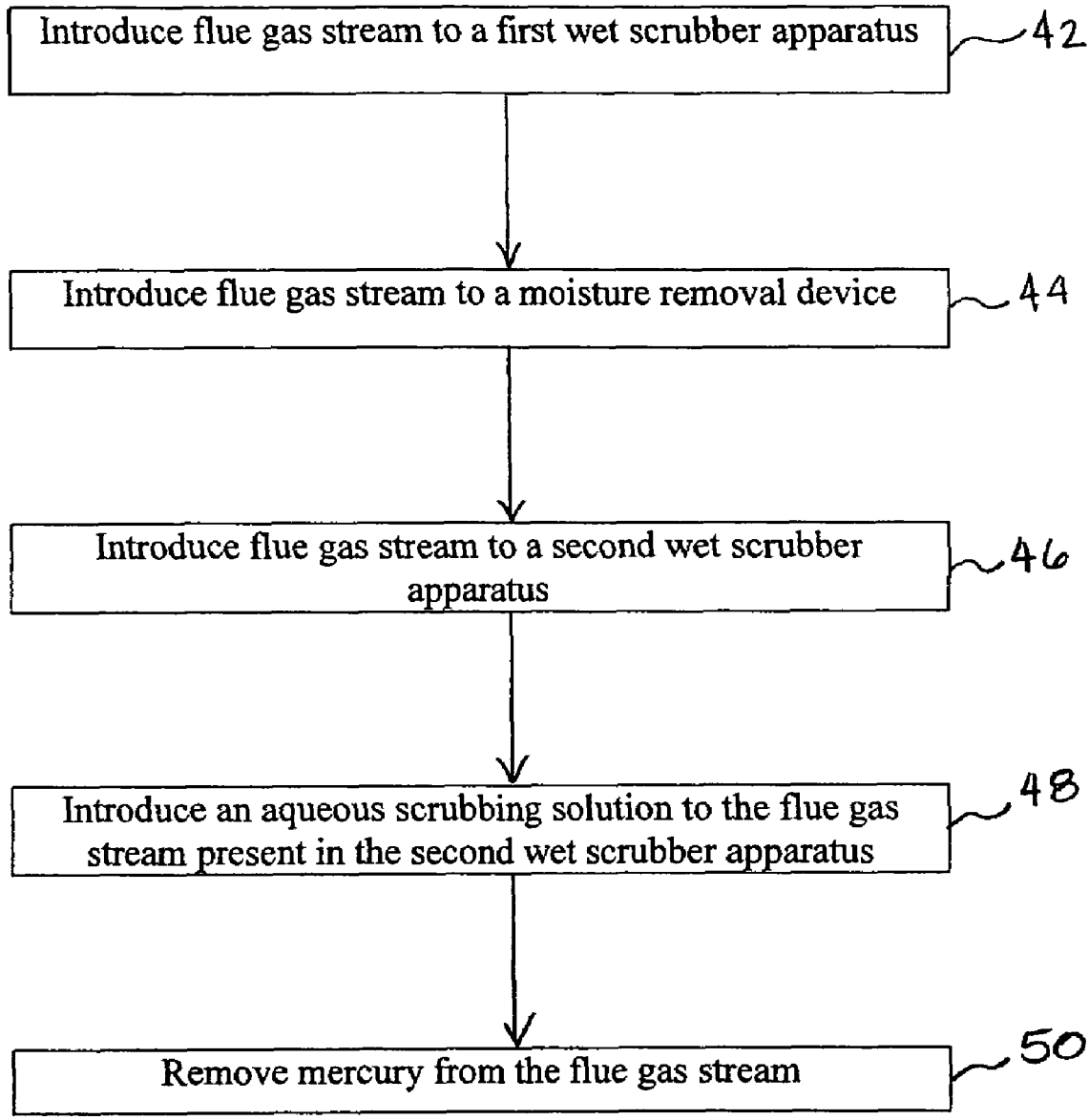
FIG. 4 illustrates one embodiment of a method for treating flue gas.

Referring now to the process sequence shown in FIG. 4, in step 42, flue gas stream 22, from which all or a substantial portion of the fly ash has been removed, is introduced to first wet scrubber apparatus 24. First wet scrubber apparatus 24 typically removes contaminants through a first wet scrubbing process that uses a calcium-based slurry sprayed into the first scrubbing apparatus. Typically, such process is for the principal purpose of reducing the concentration of sulfur oxides present in the flue gas stream.

In a WFGD system, for example, a calcium-based slurry is sprayed into the scrubbing apparatus for contact with the flue gas, whereby $SO_2$ present in the flue gas stream reacts with the alkaline slurry components to form calcium sulfate or calcium sulfite. A substantially water-saturated flue gas stream is produced by first wet scrubber apparatus 24 after flue gas stream 22 has been subjected to the scrubbing process.

After such treatment, in step 44, flue gas stream 22 may be introduced to moisture removal device 30, which is used to remove moisture from the flue gas stream. As shown in FIGS. 1-3, moisture removal device 30 is operatively connected to first wet scrubber apparatus 24 to collect slurry droplets and remove moisture from flue gas stream 22.

Once flue gas stream 22 has passed through first wet scrubber apparatus 24 and moisture removal device 30, in step 46, the flue gas stream is then introduced to second wet scrubber apparatus 32 located downstream of the moisture removal device. At this stage, flue gas stream 22 contains less than about 100 ppm of $SO_2$, however the flue gas stream still contains other contaminants, such as mercury.

In step 48, second wet scrubber apparatus 32 removes contaminants, including mercury, through a second wet scrubbing process that uses an aqueous acidic scrubbing solution containing hydrogen peroxide, sprayed into the second wet scrubber apparatus. From second wet scrubber apparatus 32, flue gas stream 22 may be subjected to further downstream flue gas treatment, or be released into the atmosphere through stack 40.

Second wet scrubber apparatus 32 is fed by tank 34 which holds the aqueous acidic scrubbing solution that facilitates the removal of mercury from flue gas stream 22. The aqueous acidic scrubbing solution contains hydrogen peroxide at a concentration of between about 0.1 to about 15% by weight based on the weight of the aqueous acidic scrubbing solution. The hydrogen peroxide content of the solution is replenished through use of commercially available hydrogen peroxide solutions containing from about 15% to about 50% by weight of hydrogen peroxide, based on the weight of the hydrogen peroxide solution, with a separate feed of dilution water to produce the requisite hydrogen peroxide concentration in the scrubbing solution. The aqueous acidic scrubbing solution has a pH less than about 1.

As shown in step 50, the aqueous acidic scrubbing solution containing hydrogen peroxide is effective to remove at least a portion of the mercury from flue gas stream 22 through formation of mercury oxides ($HgO_x$). The formed mercury oxides are dissolved or otherwise captured by the aqueous acidic scrubbing solution and thus removed from flue gas stream 22.

The aqueous acidic scrubbing solution containing hydrogen peroxide is introduced to second wet scrubber apparatus 32 for contact with flue gas stream 22 by spraying or misting the aqueous acidic scrubbing solution into the scrubbing apparatus. Alternatively, flue gas stream 22 may pass over a collection or pool of the aqueous acidic scrubbing solution located within second wet scrubber apparatus 32.

After being scrubbed with the aqueous acidic solution, flue gas stream 22 is received by a stack 40 and released into the atmosphere. The aqueous acidic scrubbing solution containing the contaminants removed from flue gas stream 22 is discharged from second wet scrubber apparatus 32. The discharged aqueous acidic solution typically contains sulfuric acid and mercury and can be subjected to further treatment, for example neutralization by the addition of lime or limestone, or any other neutralizing compound. Alternatively, the discharged aqueous acidic scrubbing solution can be sent to a waste water treatment plant for disposal.

One or more embodiments of the present invention have been described. Nevertheless, it will be understood that various modifications may be made without departing from the spirit and scope of the invention. Accordingly, other embodiments are within the scope of the following claims.

What is claimed is:

1. A process for treating a flue gas stream produced by combustion of coal, to reduce a content of mercury in the flue gas stream, the process comprising:
   subjecting the flue gas stream to a particulate collector;
   thereafter subjecting the flue gas stream to a first wet scrubbing process for reducing a concentration of sulfur oxides therein through contact of the flue gas stream with an aqueous calcium-based slurry to form sulfate and sulfite salts and produce a flue gas stream having a reduced sulfur oxide content;
   thereafter passing the flue gas stream through a mist eliminator to remove moisture from the flue gas stream; and
   thereafter subjecting the flue gas stream to a second wet scrubbing process having an aqueous acidic scrubbing solution comprising hydrogen peroxide to produce a flue gas having a reduced mercury content.

2. A process according to claim 1 wherein the aqueous acidic scrubbing solution has a hydrogen peroxide concentration between about 0.1% to about 15% by weight based on the weight of the aqueous acidic scrubbing solution.

3. A process according to claim 1 wherein the aqueous acidic scrubbing solution has a pH less than about 1.

4. A process according to claim 1 wherein the aqueous acidic scrubbing solution is prepared with a hydrogen peroxide solution having a hydrogen peroxide concentration between about 15 to about 50% by weight based on the weight of the hydrogen peroxide solution.

5. A process according to claim 1, wherein the flue gas stream subjected to the second wet scrubbing process comprises less than about 100 ppm of sulfur dioxide.

* * * * *